Aug. 17, 1954  A. O. BRUESTLE  2,686,663
EASILY REMOVED CUTTER BIT
Filed Sept. 19, 1950

INVENTOR.
ARMIN O. BRUESTLE,
BY Allen + Allen
ATTORNEYS.

Patented Aug. 17, 1954

2,686,663

UNITED STATES PATENT OFFICE 2,686,663

EASILY REMOVED CUTTER BIT

Armin O. Bruestle, Cincinnati, Ohio, assignor to The Cincinnati Mine Machinery Co., Cincinnati, Ohio, a corporation of Ohio Application September 19, 1950, Serial No. 185,522

8 Claims. (Cl. 262—33)

My invention relates to a cutter bit adapted to be inserted and retained within the bit block of mining machines of the type composed of an endless chain of blocks carrying bits which are used to cut into a wall of coal for removing the same. One of such a type of chain and bit block is shown in Stenger and Bruestle Patent No. 2,211,525 issued August 13, 1940.

Cutter bits are normally inserted in the bit block chain and removed therefrom when they become worn in the relative darkness and confining space of a coal mine. Bits are ordinarily removed from the aperture in the block by hand and it is a decided advantage to provide a bit which may be quickly and easily removed and replaced by a new bit.

During the cutting action, some of the coal and other harder material is broken up into a fine dust. This dust has a tendency to work down along the shank of the bit and pack between the shank and the recess walls of the block and make it very difficult to remove the bit. The cutter bit is usually manually removed and is quite difficult to grasp, since there are no indentations or rough portions which can be held by the fingers. In the event the bit is tightly jammed, it is difficult to pry loose by means of a tool, since there is usually no portion of the bit under which a tool may be inserted to pry loose the bit from the block.

It is an object of my invention to provide a cutter bit which has indentations so it may be easily grasped by the fingers and removed from the bit block by hand.

It is a further object of my invention to provide a cutter bit which has a rearwardly projecting shoulder on the head portion of the bit and spaced from the bit block so that a tool may be placed between the shoulder and the bit block to pry the bit loose by a levering action.

A further object of my invention is to provide a cutter bit wherein the shank is wedge-shaped in longitudinal cross section so that it may be easily removed from the block aperture, but which is so constructed that the strength of the bit or the shank is not sacrificed. A further object of my invention is to provide a cutter bit which is rugged in construction, but relatively easily manufactured.

In the cutting of coal, it is a decided advantage to convey away the cuttings from the tip or cutting edge of the bit as smoothly and easily as possible, since this reduces the load on the cutting chain and permits it to be run at a faster speed. Hence, it is a further object of my invention to provide a configuration on the leading edge of my cutter bit which smoothly conveys away the cuttings and, therefore, decreases the power consumption necessary to run the chain.

These and other objects of my invention which will be set forth hereinafter or will be apparent to one skilled in the art upon reading these specifications, I accomplish by that certain construction and arrangement of parts of which I shall now describe an exemplary embodiment. Reference is now made to the drawings which form a part thereof and in which.

Figure 1:
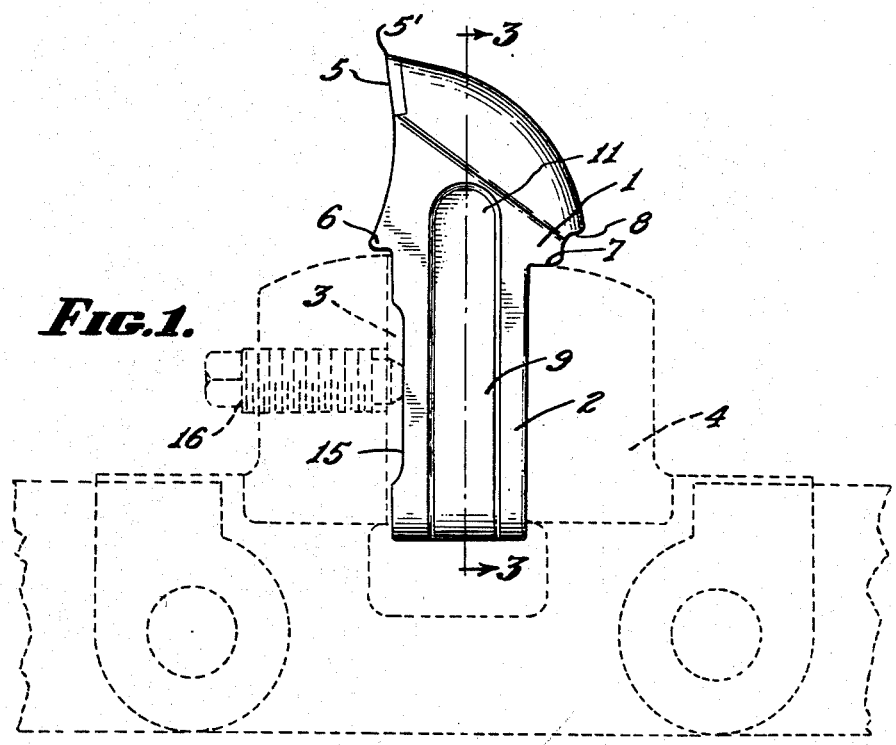
Figure 1 is a side elevation of my cutter bit in position in a bit block. The bit block is shown in section in broken lines.

Briefly, in the practice of my invention, I provide a cutter bit of the type having a shank which is held within a recess of the bit block with the head portion projecting above the bit block. I provide an indented or recessed panel on each side of the shank which terminates in a wall above the shank portion and in the side of the head portion. The panels are indented at a progressive depth so that the metal between the panels will be wedge-shaped in cross section from the head portion to the end of the shank. By this construction, the upper portion of the indented panel which projects beyond the bit block provides a finger gripping indentation to assist in removal of the bit. The tapered configuration of the portion of the shank between the panels permits progressively easier withdrawal movement when coal dust or other material has become packed between the shank of the bit and the interior of the block aperture.

The front or leading edge of my bit head is concave from the cutting tip down to the shank portion so as to provide a smooth easy incline for carrying away the cuttings. The end of this connection portion develops into a shoulder which projects out over the bit receiving aperture in the bit block and hence to some extent prevents some of the cuttings from lodging in the aperture and jamming the shank.

Referring to the drawings, my cutter bit consists of the head portion 1 and the shank portion 2 which is adapted to be received within the aperture 3 of the bit block 4.

The bit head 1 terminates into the leading or cutting face 5. The tip of the cutting face 5 is preferably treated so as to be of a harder metal than the rest of the bit or a hardened insert 5' composed of a harder metal such as tungsten carbide is provided. The concave configuration 5 of the leading edge of the bit terminates in a shoulder portion 6. The rear of the head 1 terminates in a shoulder portion 7 and slightly above the shoulder portion 7 I provide a second shoulder 8 which is spaced above the surface of the bit block 4 when the bit is in place.

Figures 2, 3:
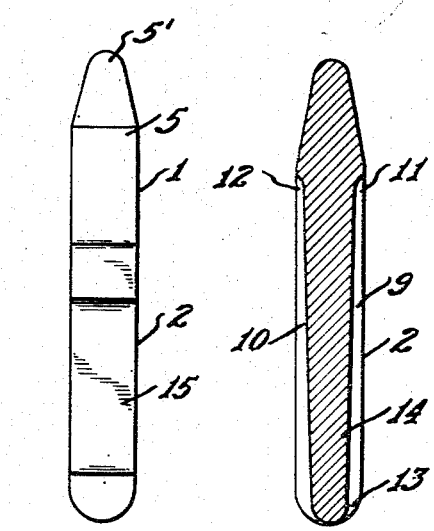
Figure 2 is a front elevation of the cutter bit.
Figure 3 is a cross section of the cutter bit taken on the section line 3—3 of Figure 1.
Figure 4:
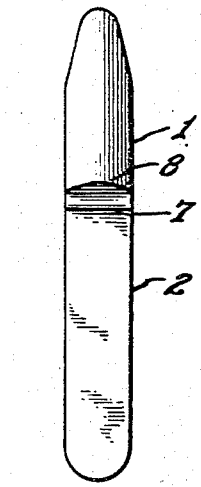
Figure 4 is a rear elevation of my cutter bit.

I provide recess panels 9 and 10 on each side of the shank portion 2 with the ends 11 and 12 projecting above the shank portion 2 and into the sides of the head portion 1 as shown in Figure 1. The panels 9 and 10 are recessed as shown in Figure 3 with the portion 11 and 12 being slightly recessed and the indentation or recess being progressively deeper towards the end 13 of the shank 2. This results in the material 14 of the shank between the recesses 9 and 10 being tapered (see Figure 3).

The front portion of the shank 2 is recessed as at 15 so that in the event the set screw 16 should become loose the cutter bit will not completely fall out of the aperture 3.

The shoulder 8 on the head portion 1 being spaced above the bit holder 4 permits a tool or bar to be inserted between the shoulder 8 and the top of the bit holder 4 so that the prying action against the shoulder 8 will assist in removing the bit from the holder. The portions 11 and 12 of the recesses 9 and 10 project sufficiently above the bit holder 4 as to permit the operator's fingers to be inserted in that portion of the recess and assist in pulling the bit from the block. Since the portion 14 of the shank is tapered and becomes progressively narrower towards the end, a slight dislodgment of the shank in the dirt and dust packed in the aperture and a slight withdrawal of the bit results in a hole in the dirt and dust being progressively larger than the wedge-shaped portion of the shank as it is withdrawn. This makes it relatively easy to remove the shank from the packed aperture.

The curved leading edge 5 of the bit smoothly guides the cuttings away from the cutting tip 5' and down along its face towards the shoulder 6. The shoulder 6 projects beyond the block aperture 3 so that these cuttings are not led into the aperture 3, but are diverted.

From the above, it is apparent that I have provided a cutter bit which may be easily and quickly removed from the aperture of a bit block, even though coal dust has been packed tightly between the shank of the cutter bit and the walls of the aperture of the block. In the event the bit is tightly jammed in the block aperture, a bar or any slender tool may be slipped under the shoulder 8 of the bit head and the bit pried upwardly from the block until it is loosened when it may be easily removed by the fingers positioning themselves in the apertures 11 and 12 in the side of the bit head.

It is also apparent that I have provided a cutter bit having a leading edge which is concave in side elevation from the cutting tip to the bit block so that cuttings will be smoothly removed from around the cutting tip and guided forwardly of the bit aperture of the block.

My cutter bit is extremely rugged and yet may be easily formed. The removal of the metal from the indented panels lightens the overall weight of the bit without weakening its structure.

It is to be understood that modifications may be made in my invention without departing from the spirit thereof and I do not intend to limit myself otherwise than as pointed out in the claims which follow.

Having thus described my invention, what I claim as new and desire to secure by Letters Patent is:

1. In a cutter bit of the class having a shank adapted to be retained within the socket of a bit block and terminating in a head portion projecting above the bit block, a recessed panel in the side of said bit shank with one end projecting into the side of the head portion, said panel terminating in a wall in said head portion and extending the full length of said shank portion, said recess being progressively deeper along its length from the wall end thereof so that the material forming the bit below the panel is tapered throughout its length.

2. In a cutter bit having a head portion and a shank portion and adapted to be held in a bit block with the shank portion in an aperture in the block and the head portion projecting above the block, a recessed panel on opposite faces of the shank portion and terminating in a wall beyond the shank portion and in the side of the head portion, said recessed panel running the full length of the shank portion and being progressively deeper along its length toward the shank end so that the material of the shank portion between the recessed panels is wedge-shaped in longitudinal cross section.

3. In a cutter bit of the class having a shank adapted to be retained within the socket of a bit block and terminating in a head portion projecting above the bit block, a recessed panel in the side of said bit shank with one end projecting into the side of the head portion, said panel terminating in a wall in said head portion and extending the full length of said shank portion, said recess being progressively deeper along its length from the wall end thereof so that the material forming the bit below the panel is tapered throughout its length, said recessed portions being of a width sufficient to accommodate the fingers of an operator and projecting into the head portion a distance at least as great as its width.

4. A cutter bit of the class having a shank adapted to be retained within the socket of a bit block and terminating at one end in a head portion projecting above the bit block, said shank being substantially rectangular in cross-section and of substantially uniform cross-sectional dimensions throughout its length, at least one recessed panel formed longitudinally in a side of said shank and extending downwardly to the shank end opposite said head, said panel being of lesser width than the said shank side, and becoming progressively deeper as the panel approaches the end of said shank opposite said head so that in the area of said panel said shank is tapered toward its end opposite said head.

5. The structure claimed in claim 4 wherein said head is provided with a shoulder which, abutting the surface of said bit block, fixes the longitudinal position of said cutter bit with respect to said bit block, and is provided with another shoulder at a greater distance from the end of said shank opposite said head whereby said second shoulder lies above the surface of said bit block when said cutter bit is in position in said bit block, and may be employed for prying said cutter bit from the socket of said bit block.

6. The structure claimed in claim 5 wherein said cutting bit has a cutting tip and both of said shoulders are located at the side of said head opposite said cutting tip.

7. The structure claimed in claim 5 wherein said cutting bit has a cutting tip and both of said shoulders are located at the side of said head opposite said cutting tip, wherein said cutting tip is a hard insert in the material of said head at a point remote from the point at which said head joins said shank, and wherein the material of said head below said cutting tip is concave in side elevation.

8. The structure claimed in claim 5 wherein said cutting bit has a cutting tip and both of said shoulders are located at the side of said head opposite said cutting tip, wherein said cutting tip is a hard insert in the material of said head at a point remote from the point at which said head joins said shank, and wherein the material of said head below said cutting tip is concave in side elevation, and terminates in a third shoulder extending forwardly of said shank and positioned a greater distance from the end of said shank opposite said head than said first mentioned shoulder.

References Cited in the file of this patent

UNITED STATES PATENTS

| Number | Name | Date |
| --- | --- | --- |
| 482,046 | Legg | Sept. 6, 1892 |
| 1,376,120 | Smith | Apr. 26, 1921 |
| 2,330,081 | Phipps | Sept. 21, 1943 |
| 2,413,585 | Simmons et al | Dec. 31, 1946 |
| 2,449,288 | Fulke | Sept. 14, 1948 |
| 2,521,089 | Phipps | Sept. 5, 1950 |
| 2,547,325 | Johnson | Apr. 3, 1951 |

FOREIGN PATENTS

| Number | Country | Date |
| --- | --- | --- |
| 381,708 | Germany | Sept. 24, 1923 |